(12) United States Patent
Brouse et al.

(10) Patent No.: US 12,132,810 B2
(45) Date of Patent: Oct. 29, 2024

(54) PROTOCOL AUTO-DETECTION

(71) Applicant: TEXAS INSTRUMENTS INCORPORATED, Dallas, TX (US)

(72) Inventors: Keith Charles Brouse, Vail, AZ (US); Michael Douglas Snedeker, Tucson, AZ (US); Hugo Cheung, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 445 days.

(21) Appl. No.: 16/224,092

(22) Filed: Dec. 18, 2018

(65) Prior Publication Data
US 2020/0195759 A1 Jun. 18, 2020

(51) Int. Cl.
*H04L 69/18* (2022.01)
*G06F 13/42* (2006.01)
*H04L 69/14* (2022.01)

(52) U.S. Cl.
CPC .......... *H04L 69/18* (2013.01); *G06F 13/4282* (2013.01); *H04L 69/14* (2013.01)

(58) Field of Classification Search
CPC ...... H04L 69/18; H04L 69/14; G06F 13/4282
See application file for complete search history.

(56) References Cited

U.S. PATENT DOCUMENTS

| | | | | |
|---|---|---|---|---|
| 6,038,400 A * | 3/2000 | Bell | ................... | G06F 13/4291 326/37 |
| 10,684,974 B1 * | 6/2020 | Wright | ................ | G06F 13/4022 |
| 2008/0270667 A1 * | 10/2008 | Bracamontes Del Toro | ............... | G06F 13/4018 710/306 |
| 2010/0150338 A1 * | 6/2010 | Nguyen | ............... | G06F 13/4291 379/412 |
| 2012/0079138 A1 * | 3/2012 | Obkircher | ........... | G06F 13/4291 710/15 |
| 2013/0019037 A1 * | 1/2013 | Flippin | ............... | H01M 10/425 710/105 |
| 2013/0100825 A1 * | 4/2013 | Bancel | ............... | G06K 7/10297 370/242 |
| 2013/0205054 A1 * | 8/2013 | Wright | ...................... | H03L 5/02 710/105 |
| 2013/0218507 A1 * | 8/2013 | Waayers | ............ | G01R 31/3172 702/119 |
| 2017/0075852 A1 * | 3/2017 | Mishra | ................ | G06F 13/4282 |
| 2020/0076443 A1 * | 3/2020 | McDonough | ........... | H03M 1/30 |

* cited by examiner

*Primary Examiner* — Scott B Christensen
(74) *Attorney, Agent, or Firm* — John R. Pessetto; Frank D. Cimino

(57) ABSTRACT

A device includes an interface. The interface includes a plurality of pins. The interface further includes first components configured to interpret signals received at the plurality of pins according to a first protocol. The device further includes second components configured to the interpret signals received at the plurality of pins according to a second protocol. The first components are configured to disable the second components in response to a determination that the signals received at the pins correspond to the first protocol. Further, the second components are configured to disable the first components in response to a determination that the signals received at the pins correspond to the second protocol.

19 Claims, 6 Drawing Sheets

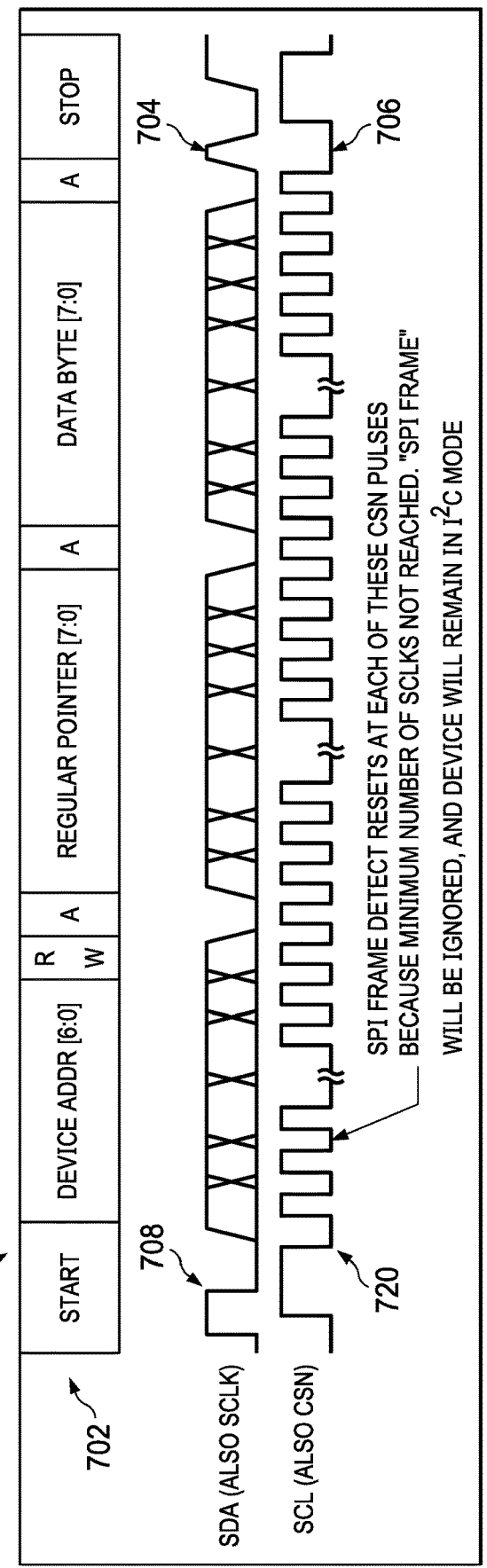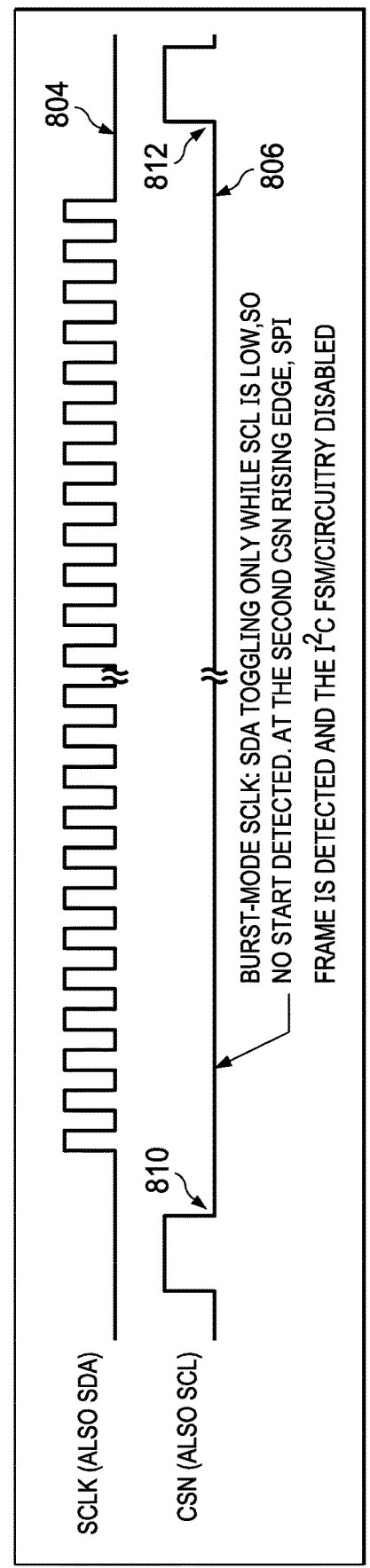

PROTOCOL AUTO-DETECTION

BACKGROUND

Computing devices frequently include a variety of components, such as peripheral integrated circuits, microcontrollers, etc. Such components are configured to exchange data by transmitting and interpreting signals according to a communication protocol. There are a variety of communication protocols that are currently in use. For example, some computing device components are configured to communicate using inter-integrated circuit ($I^2C$) protocol while other computing device components are configured to communicate using serial peripheral interface (SPI) protocol. Signals transmitted to a computing device based on a particular protocol may be interpreted incorrectly if the computing device is not configured to operate on data according to the particular protocol. Accordingly, an $I^2C$ device may be unable to properly process data received from a SPI device and a SPI device may be unable to properly process data received from an $I^2C$ device.

Components that can switch from operating according to one protocol to operating according to another protocol have been developed to provide a more versatile product for end users and to simplify inventory requirements for sellers. Such components include one or more dedicated pins configured to toggle the device between operating various protocols. However, incorporating such dedicated pins in an interface of a component increases a size of the interface or sacrifices a data pin.

SUMMARY

Disclosed is an apparatus that is configured to operate according to more than one communication protocol. Further, methods of operating such an apparatus are disclosed. In some implementations, the apparatus is configured to operate according to $I^2C$ and SPI protocols. The apparatus is configured to concurrently monitor signals received at input pins according to more than one protocol (e.g., $I^2C$ and SPI) and to automatically detect which of the protocols was used to transmit the signals. The apparatus then stops monitoring the input pins for the other protocol(s) and continues functioning according to the detected protocol.

Thus, the disclosed apparatus may be used in systems that operate according to any one of several different protocols. Advantageously, the disclosed apparatus is able to detect which protocol to use automatically without monitoring a dedicated protocol selection pin or receiving a message explicitly identifying a protocol to use for communication (e.g., a communication configuration/setup message).

A disclosed method includes receiving signals at pins of an interface. The method further includes concurrently processing the signals according to a first protocol at first components of the interface and according to a second protocol at second components of the interface. The method further includes transmitting a reset signal from the first components to the second components to disable the second components in response to determining, at the first components, that the signals received at the pins correspond to the first protocol.

A disclosed device includes an interface. The interface includes a plurality of pins. The interface further includes first components configured to interpret signals received at the plurality of pins according to a first protocol. The device further includes second components configured to the interpret signals received at the plurality of pins according to a second protocol. The first components are configured to transmit a reset signal to the second components to disable the second components in response to a determination that the signals received at the pins correspond to the first protocol. Further, the second components are configured to transmit a second reset signal to the first components to disable the first components in response to a determination that the signals received at the pins correspond to the second protocol.

BRIEF DESCRIPTION OF THE DRAWINGS

For a detailed description of various examples, reference will now be made to the accompanying drawings in which:

FIG. 7 is a timing diagram showing an $I^2C$ byte received at one of the interfaces illustrated in FIGS. 4-6.

FIG. 8 is a first timing diagram showing an SPI frame received at one of the interfaces illustrated in FIGS. 4-6

DETAILED DESCRIPTION

Figure 1:
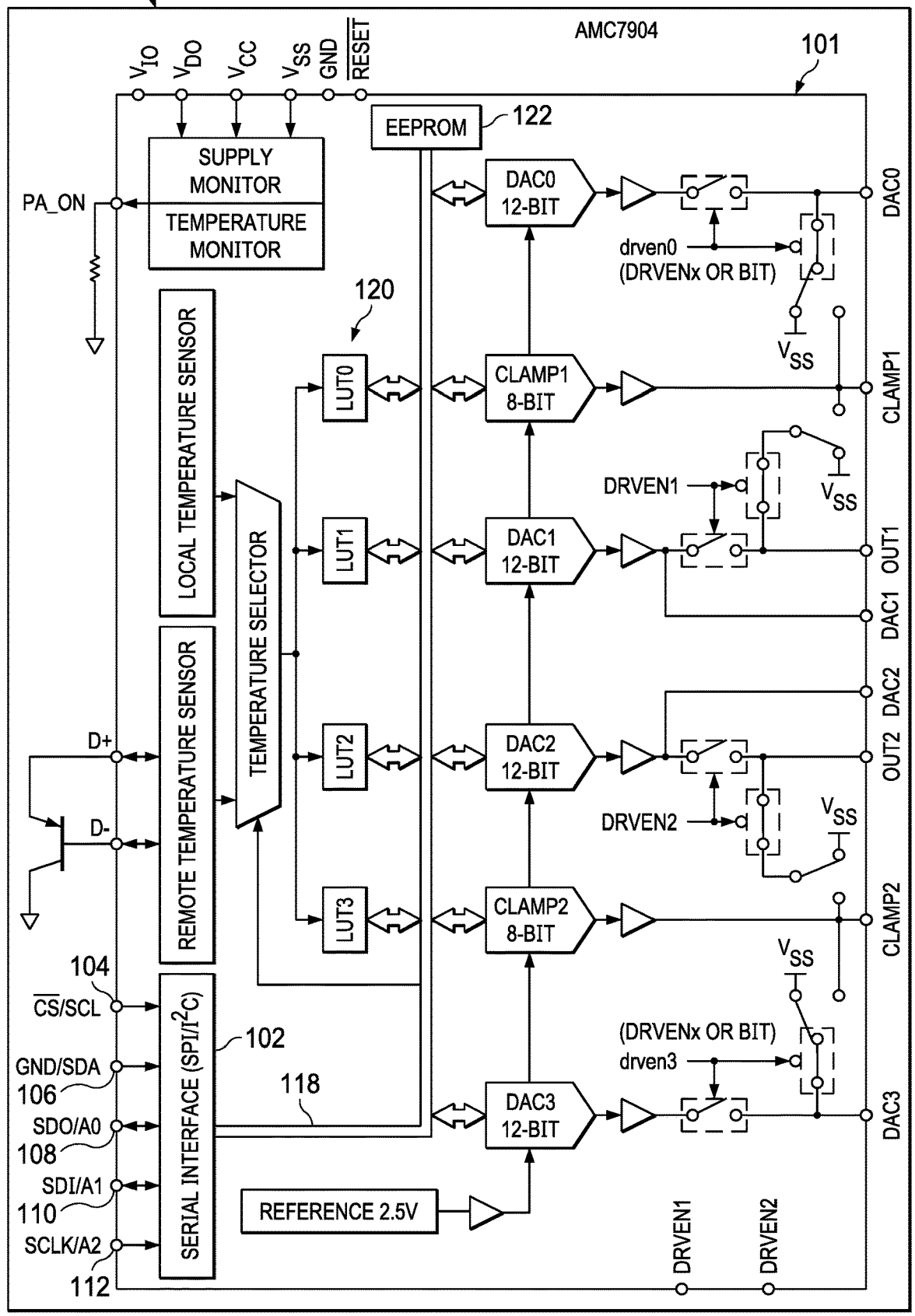
FIG. 1 illustrates a diagram of a package including a device with an interface that operates according to more than one protocol is shown.

Referring to FIG. 1, a diagram of a package 100 including a device 101 (e.g., a semiconductor device) with an interface 102 that operates according to more than one protocol is shown. The package 100 may include epoxy, silicone, polyimide, a combination thereof, or other materials. The device 101 is embedded in the package 100 such that the package 100 protects the device 101. In the illustrated example, the device 101 corresponds to an analog monitoring and control device. The device 101 includes an interface 102 capable of communicating via more than one communication protocol. The package 100 and the device 101 are illustrated to provide an example of a context in which the interface 102 may be included. In other implementations, the interface 102 may be included in a different device either in or independent of a package.

In the illustrated example, the device 101 includes look-up tables 120 coupled to the interface via a bus 118. In addition, the device 101 includes an electrically erasable programable read-only memory (EEPROM) 122 coupled to the bus 118. Data received via the interface 102 is stored in the EEPROM 122 and the look-up tables 120 and is used by the device 101 to control operations of various other components of the device 101.

The interface 102 is configured to automatically detect a communication protocol used to transmit signals to the interface 102 from an external device, as explained further below, and then to use that communication protocol to interpret received signals and to transmit signals. Accordingly, the device 101 can be coupled to and communicate with another device that operates according to any one of several supported protocols. In the illustrated example, the interface 102 is configured to operate according to both inter-integrated circuit ($I^2C$) protocol and serial peripheral interface (SPI) protocol but different combinations of protocols may be supported in other implementations. The interface 102 includes a first pin 104, a second pin 106, a third pin 108, a fourth pin 110, and a fifth pin 112.

The interface 102 monitors signals received by the pins 102-112 and sends the signals to both interface components associated with $I^2C$ communication and interface components associated with SPI communication. Each of the pins 104-112 is thus mapped to both an $I^2C$ signal and an SPI signal. At least some of the mappings do not map analogous signals in the different protocols to the same pin. To illustrate, in the illustrated example, a clock signal for SPI (e.g., a serial clock signal (SCLK)) is mapped to the fifth pin 112 while a clock signal for $I^2C$ (e.g., a serial clock (SCL)) is mapped to the first pin 104. Because at least some analogous signals from the two different protocols are mapped to different pins, signals transmitted to the interface 102 according to one of the protocols will be recognized by the corresponding protocol components of the interface 102 while being unrecognized by the other protocol components of the interface 102. In the illustrated example, the first pin 104 is mapped to a chip select signal ($\overline{CS}$) in the SPI protocol and to SCL in the $I^2C$ protocol. The second pin 106 is mapped to ground (GND) in the SPI protocol and to a serial data (SDA) signal in the $I^2C$ protocol. The third pin 108 is mapped to a serial data out (SDO) signal in the SPI protocol and to an address 0 bit (A0) signal in the $I^2C$ protocol. The fourth pin 110 is mapped to a serial data in (SDI) signal in the SPI protocol and to an address 1 bit (A1) signal in the $I^2C$ protocol. The fifth pin 112 is mapped to the SCLK signal in the SPI protocol and to an address 2 bit (A2) in the $I^2C$ protocol.

As explained further below, the $I^2C$ components of the interface 102 monitor the pins assigned to SCL (e.g., the first pin 104) and SDA (e.g., the second pin 106) to determine whether received signals are $I^2C$ signals and the SPI components of the interface simultaneously monitor the pins assigned to $\overline{CS}$ (e.g., the first pin 104) and SCLK (e.g., the fifth pin 112) to determine whether the signals are SPI signals. Once $I^2C$ or SPI is detected, interface components of the other protocol are disabled and the interface continues operating according to the detected protocol.

Thus, the device 101 may be used in conjunction with a greater variety of devices as compared to a device that includes an interface that only operates according to a single protocol. Further, the interface 102 may be smaller or include more data pins as compared to an interface that relies on a dedicated pin to switch between protocols. In addition, because the interface 102 automatically detects a communication protocol used to transmit signals to the interface 102, a device communicating with the interface 102 need not send a special configuration message to the device 101 in order for the interface 102 to select an appropriate protocol. Thus, devices that communicate with the device 101 need not be modified to support the ability of the device 101 to operate according to more than one protocol.

Figure 2:
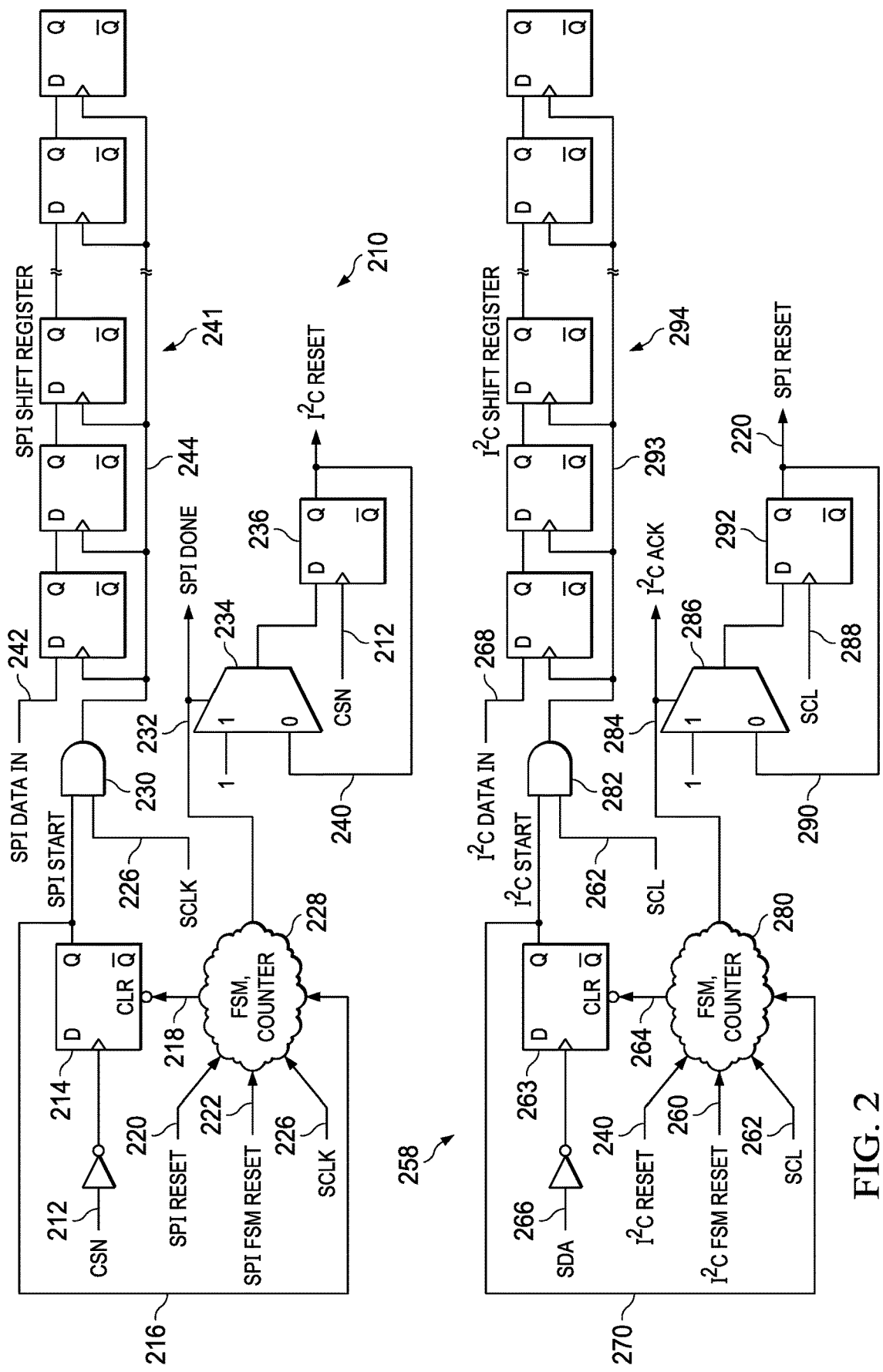
FIG. 2 illustrates a diagram of an interface that includes both serial peripheral interface (SPI) protocol components and inter-integrated circuit ($I^2C$) protocol components.

Referring to FIG. 2, a diagram illustrating SPI components 210 and $I^2C$ components 258 of an interface, such as the interface 102, is shown. The SPI components 210 include an SPI finite state machine 228, a first flip flop device 214, a first AND gate 230, an SPI shift register 241, a first multiplexor 234, and a second flip flop device 236. The $I^2C$ components 258 include an $I^2C$ finite state machine 280, a third flip flop device 263, a second AND gate 282, an $I^2C$ shift register 294, a second multiplexor 286, and a fourth flip flop device 292. The finite state machines 228, 280 may be implemented in hardware and may include one or more programmable logic devices, one or more programmable logic controllers, one or more logic gates, one or more flip flop devices, one or more relays, one or more other components, or a combination thereof. In some examples, the finite state machines 228, 280 are implemented in software. For example, the finite state machines 228, 280 may correspond to one or more processors and one or more computer readable storage devices storing instructions executable by the one or more processors to perform the operations described herein.

The SPI finite state machine 228 receives a SPI reset line 220, an SPI finite state machine reset line 222, and an SCLK line 226. The SCLK line 226 is coupled to a pin of the interface that includes the SPI components 210. For example, the SCLK line 226 may be coupled to the fifth pin 112 of the interface 102. The SPI finite state machine 228 monitors the SCLK line to determine whether a SPI frame has been received and drives an SPI done line 232 based on the determination. The SPI reset line 220 is driven by the $I^2C$ components 258. Further, while not illustrated, the SPI reset line 220 may correspond to the CSN line 212. The SPI finite state machine 228 is configured to drive a SPI clear (CLR) line 218 based on the SCLK line 226. The first flip flop device 214 drives an SPI start line 216 based on the SPI CLR line 218 and an inverted CS not (CSN) line 212. As used herein CSN and $\overline{CS}$ are interchangeable. The CSN line 212 may be coupled to the first pin 104 of the interface 102. A falling edge on the CSN line 212 causes the first flip flop device 214 to store a high value and cause the SPI start line 216 to be driven high. The SPI start line 216 being driven high causes the SPI finite state machine 228 to leave an idle state as described further below. The SPI finite state machine 228 drives the SPI CLR 218 based on a count of SCLK to clear the content of the first flip flop device 214.

The first AND gate 230 receives the SPI start line 216 and the SCLK line 226 and drives an SPI shift register clock line 244 accordingly. The SPI shift register 241 includes flip flops clocked by the SPI shift register clock line 244. When the SPI start line 216 is high, the SPI shift register clock line 244 matches the SCLK line 226. When the SPI start line 216 is low, the SPI shift register clock line 244 is low and the SPI shift register 241 is disabled. Thus, the SPI finite state machine 228 is configured to disable the SPI shift register 241 based on the SPI reset line 220. As illustrated, the SPI shift register 241 is configured to receive and store data from an SPI data in line 242 when enabled. The SPI data in line 242 may be coupled to the fourth pin 110 of the interface 102.

The SPI finite state machine 228 drives an SPI done line 232 based on whether the SPI finite state machine 228 has detected a complete SPI frame. The SPI finite state machine 228 determines whether a complete SPI frame has been detected based on a count of pulses on the SCLK line 226 while the SPI reset line 220 (i.e., the CSN line 212) is low. The SPI finite state machine 228 is configured to prevent the SCLK count from incrementing in response to detecting that the SPI finite state machine reset line 222 is high. The first multiplexor 234 receives a high signal and an $I^2C$ reset line 240 as inputs and selects an output based on a value of the SPI done line 232. The second flip flop device 236 receives output of the first multiplexor 234 as input, is clocked by the CSN line 212, and drives the I²C reset line 240 accordingly.

The first multiplexor 234 is configured to select the I²C reset line 240 as output in response to the SPI done line 232 having a low value. Further, the second flip flop device 236 initially stores a low signal. Accordingly, while the SPI done line 232 is low, the second flip flop device 236 continues to store and output a low signal responsive to the CSN line 212. In contrast, the first multiplexor 234 is configured to select the high signal in response to detecting the SPI done line 232 is high. Upon detecting a rising edge of the CSN line 212 and a high value from the first multiplexor 234, the second flip flop device 236 begins driving the I²C reset line 240 at a high value. Once the I2C signal is driven high, both values received by the multiplexor are high and so the second flip flop device 236 outputs a high value on the I²C reset line 240 regardless of a condition of the SPI done line 232. As explained further below, a high value on the I²C reset line 240 disables the I²C components 258. Accordingly, once the SPI finite state machine 228 detects a complete SPI frame and drives the SPI done line 232 high during a rising edge on the CSN line 212, the I²C components 258 are disabled. While not illustrated, the second flip flop device 236 may be reset back to store a low value by an external reset, a power-on reset, or a software reset command. Resetting the second flip flop device 236 reenables the I²C components 258 and causes the interface to enter protocol auto-detect mode.

The I²C finite state machine 280 receives the I²C reset line 240, an I²C finite state machine reset line 260, and an SCL line 262. A high value on the I²C finite state machine reset line 260 disable the I²C finite state machine 280. The SCL line 262 is coupled to a pin of the interface that includes the I²C components 258. For example, the SCL line 262 may be coupled to the first pin 104 of the interface 102. While not illustrated, the I²C state machine 280 further receives contents of the I²C shift register 294 as input. The I²C finite state machine 280 monitors the SCL line 262 and the content of the I²C shift register 294 to determine whether an I²C message has been received and drives an I²C acknowledge (ACK) line based on the determination. As explained above, the I²C reset line 240 corresponds to an output of the SPI components 210. The I²C finite state machine 280 is configured to drive an I²C CLR line 264 based on the SCL line 262. The third flip flop device 263 drives an I²C start line 270 based on the I²C CLR line 264 and an inverted SDA line 266. The SDA line 266 may be coupled to the second pin 106 of the interface 102. A falling edge on the SDA line 266 causes the third flip flop device 263 to store a high value drive the I²C start line 270 high.

The second AND gate 282 receives the I²C start line 270 and the SCL line 262 and drives an I²C shift register clock line 293 accordingly. The I²C shift register 294 includes flip flops clocked by the I²C shift register clock line 293. When the I²C start line 270 is high, the I²C shift register clock line 293 matches the SCL line 262. When the I²C start line 270 is low, the I²C shift register clock line 293 is low and the I²C shift register 294 is disabled. Thus, the I²C finite state machine 280 is configured to disable the I²C shift register 294 based on the I²C reset line 240. As illustrated, the I²C shift register 294 is configured to receive and store data from an I²C data in line 268 when enabled. The I²C data in line 268 may be the SDA line 266.

The I²C finite state machine 280 drives the I²C ACK line 284 based on whether the I²C finite state machine 228 has detected a valid I²C device ID in the I²C shift register 294. It should be noted that the I²C ACK line 284 may correspond to the SDA line 266. In some implementations, the I²C state machine 280 drives the I²C ACK line 284 low to acknowledge receipt of an I²C byte. The second multiplexor 286 receives a low signal and the SPI reset line 220 as inputs and selects an output based on a value of the I²C ACK line 284. The fourth flip flop device 292 receives output of the second multiplexor 286 as input, is clocked by the SCL line 288, and drives the SPI reset line 220 accordingly.

The second multiplexor 286 is configured to select the SPI reset line 220 as output in response to the I²C ACK line 284 having a low value. Further, the fourth flip flop device 292 initially stores a low signal. Accordingly, while the I²C ACK line 284 is low, the fourth flip flop device 292 continues to store and output a low signal responsive to the SCL line 288. In contrast, the second multiplexor 286 is configured to select the high signal in response to detecting the I²C ACK line 284 is high. Upon detecting a rising edge of the SCL line 288 and a high value from the second multiplexor 286, the fourth flip flop device 292 begins driving the SPI reset line 220 at a high value. Once the SPI reset line 220 is driven high, both values received by the multiplexor are high and so the fourth flip flop device 292 outputs a high value on the SPI reset line 220 regardless of a condition of the I²C ACK line 284. A high value on the SPI reset line 220 (i.e., the CSN line 212) disables the SPI components 210 because the high value prevents the finite state machine 228 from counting SCLK pulses and prevents the first and second flip flop devices 214, 236 from storing new values. Accordingly, once the I²C finite state machine 280 detects an I²C message and drives the I²C ACK line 284 high during a rising edge on the SCL line 288, the SPI components 210 are disabled. While not illustrated, the fourth flip flop device 292 may be reset by an external reset, a power-on reset, or a software reset command. Resetting the fourth flip flop device 292 reenables the SPI components 210 and causes an interface to enter protocol auto-detect mode.

The SPI components 210 and the I²C components 258 simultaneously monitor pins of an interface to detect that the corresponding protocol is in use. Once one of the protocols is detected, the components associated with the other protocol are disabled. Thus, FIG. 2 illustrates an example of components of an interface that supports multiple protocols. While FIG. 2 illustrates SPI components and I²C components of an interface, other combinations of protocol components may be included in an interface. Further, it should be noted that the configuration illustrated in FIG. 2 is an example of one embodiment according to the disclosure. Alternative embodiments may be arranged differently and may be configured to respond to different signal values (e.g., low instead of high or vice versa).

Figure 3:
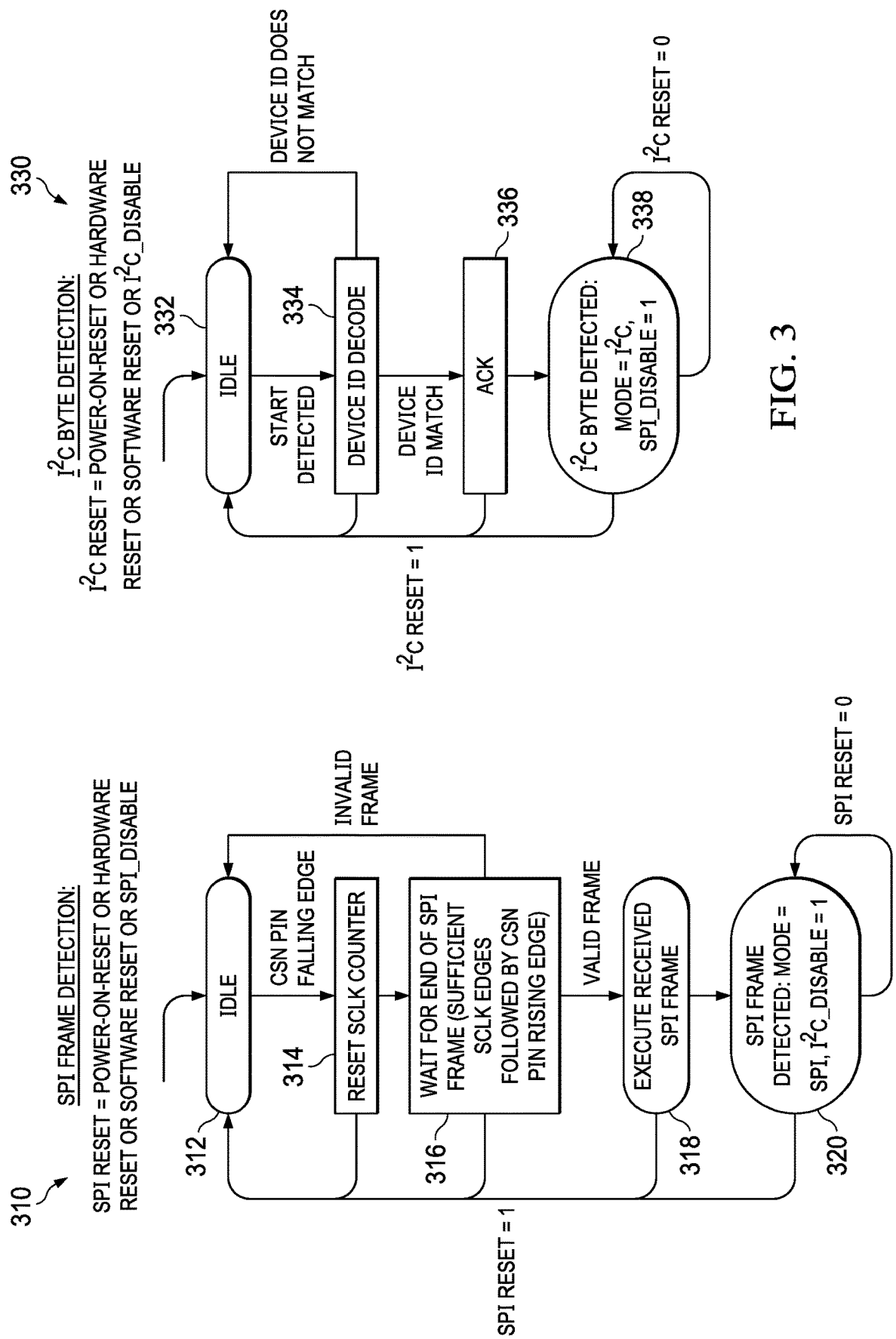
FIG. 3 includes flowcharts illustrating methods of SPI and $I^2C$ detection.

Referring to FIG. 3, flowcharts illustrating a SPI frame detection method 310 and an I²C byte detection method 330 are shown. The methods 310, 330 may be performed concurrently onboard an interface, such as the interface 102. For example, the SPI frame detection method 310 may be performed by the SPI components 210 of FIG. 2 while the I²C byte detection method 330 is performed by the I²C components 258 of FIG. 2.

The SPI frame detection method 310 includes idling, at 312. For example, the SPI finite state machine 228 may wait in an idle state until an SPI start condition is detected. The SPI frame detection method 310 further includes resetting an SCLK counter upon detecting a falling edge on a CSN line, at 314. For example, the SPI finite state machine 228 may maintain a count of rising edges detected on the SCLK line 226 (a SCLK count), and upon detecting, a falling edge on the CSN line 212 while the SPI finite state machine 228 is in the idle state, the SPI finite state machine 228 may reset the SCLK count. As used herein, a CSN falling edge while the SPI finite state machine 228 is in the idle state is a SPI start condition.

The SPI frame detection method 310 further includes returning to the idle state if an SPI reset is detected. For example, the SPI finite state machine 228 may return to the idle state in response to detecting a high value on the SPI reset line 220.

If no SPI reset is detected, the SPI frame detection method 310 further includes continuing to count SCLK rising edges while CSN is low, at 316. For example, the SPI finite state machine 228 may continue to count rising edges on the SCLK line 226 while the CSN line 212 (i.e., the SPI reset line 220) is low. The SPI frame detection method 310 further includes returning to the idle state if an SPI reset is detected or if an invalid frame SPI frame is detected. The SPI finite state machine 228 may detect an invalid SPI frame in response to a rising edge on the CSN line 212 before the SCLK counter reaches threshold count (e.g., 24) indicative of an SPI frame. In various implementations, a valid SPI frame will cause the SCLK counter to reach a value that is a multiple of 8, such as 8, 16, 24, 32, etc.

If a valid SPI frame is detected and no SPI reset is detected, the SPI frame detection method 310 includes executing the SPI frame, at 318. For example, the SPI finite state machine 228 may initiate processing of data received in the SPI shift register 241. The SPI frame detection method 310 further includes returning to the idle state if an SPI reset is detected.

If no SPI reset is detected, the SPI frame detection method 310 includes activating an interface SPI mode and disabling I²C components, at 320. For example, the SPI finite state machine 228 may drive the SPI done line 232 to a high state in order to trigger the I²C reset line 240. As explained above, the I²C finite state machine 280 may disable the I²C components 258 based on the I²C reset line 240 being driven high. In some implementations, some pins of the interface are disabled as outputs in I²C mode and these pins may be enabled as outputs by the SPI finite state machine 228 in response to entering SPI mode. For example, output from the third pin 108 (e.g., SDO in SPI) may be disabled upon startup of the interface 102 because the interface 102 defaults to the I²C mode, but in response to entering the SPI mode (e.g., in response to detecting an SPI frame), the SPI finite state machine 228 may enable output from the third pin 108.

The SPI frame detection method 310 continues to cause the interface to operate in SPI mode while no SPI reset is detected. If an SPI reset is detected, the SPI frame detection method 310 returns to the idle state.

Thus, the SPI frame detection method 310 may be used to monitor pins of an interface for SPI communications, to disable I²C components upon detection of SPI communications, and to cause an interface to interpret signals according to the SPI protocol.

The I²C byte detection method 330 includes idling, at 332. For example, the I²C finite state machine 280 may wait in an idle state until an I²C start condition is detected. The I²C byte detection method 330 further includes attempting to decode a device identifier (ID) in response to detecting an I²C start condition, at 334. For example, the I²C finite state machine 280 may attempt to decode a device ID in the I²C shift register 294 in response to detecting a falling edge on the SDA line 266 while the SCL line 262 is high (e.g., an I²C start condition).

If a decoded device ID is not recognized or an I²C reset is detected, the I²C byte detection method 330 returns to the idle state. If the decoded device ID is recognized, the I²C byte detection method 330 generates an I²C ACK. For example, the I²C finite state machine 280 may drive the I²C ACK line 284. In some embodiments, the I²C ACK line 284 is connected to a same pin as the SDA line 266 (e.g., the second pin 106 of FIG. 1). The I²C byte detection method 330 includes returning to the idle state if an I²C reset is detected. If no I²C reset is detected, the I²C byte detection method 330 includes initiating an interface I²C mode and disabling SPI components, at 338. For example, the I²C finite state machine 280 may drive the I²C ACK line 284 to cause the SPI reset line 220 to be driven high. As explained above, the SPI finite state machine is configured to disable the SPI components 210 in response to the SPI reset line 220 being driven high.

The I²C byte detection method 330 continues to cause the interface to operate in I²C mode while no I²C reset is detected. If an I²C reset is detected, the I²C byte detection method 310 returns to the idle state.

Thus, the I²C byte detection method 330 may be used to monitor pins of an interface for I²C communications, to disable SPI components upon detection of I²C communications, and to cause an interface to interpret signals according to the I²C protocol.

As explained above, the methods 310, 330 concurrently monitor pins of an interface for communications that match their respective protocols. Because some analogous signals (e.g., clock signals) of the two protocols are assigned to different pins of an interface that implements the methods 310, 330, signals according to one protocol may not cause the interface to detect the other protocol, as explained further below. Thus, the methods 310, 330 may be used to automatically detect and operate according to one of several protocols without specialized setup messaging or a dedicated protocol selection pin.

Figure 4:
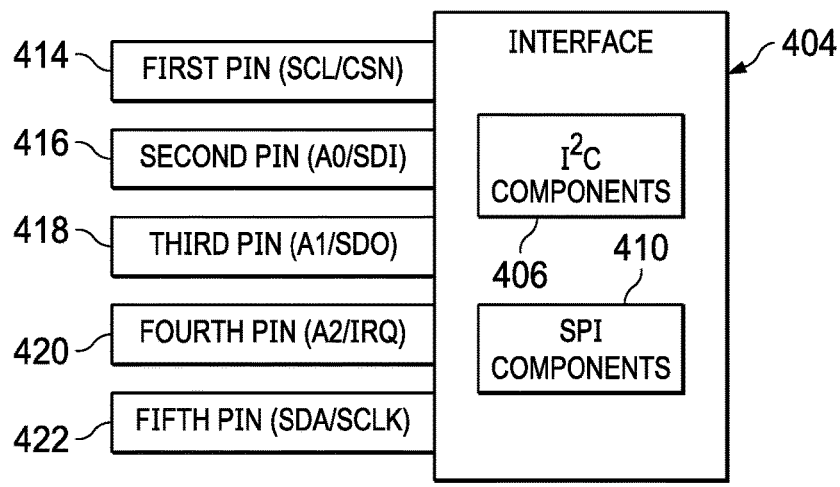
FIG. 4 is a block diagram of an alternative pin configuration for a 5 pin interface that supports both SPI and $I^2C$.

Referring to FIG. 4, a diagram of an alternative pin configuration for a 5 pin interface that supports both SPI and I²C is shown. In the illustrated example, an interface 404 includes a first pin 414, a second pin 416, a third pin 418, a fourth pin 420, a fifth pin 422, I²C components 406, and SPI components 410. The interface 404 may be included in the device 101 of FIG. 1 in lieu of the interface 102 or may be included in a different device. The I²C components 406 may correspond to the I²C components 258 and the SPI components 410 may correspond to the SPI components 210. In the illustrated example, the first pin 414 is mapped to the SCL signal for I²C and to the CSN (i.e., $\overline{CS}$) signal for SPI. The second pin 416 is mapped to the A0 signal for I²C and to the SDI signal for SPI. The third pin 418 is mapped to the A1 signal for I²C and to the SDO signal for SPI. The fourth pin 420 is mapped to the A2 signal for I²C and to an interrupt request (IRQ) signal for SPI. The fifth pin 422 is mapped to the SDA signal for I²C and to the SCLK signal for SPI.

The I²C components 406 are configured to monitor the pins 414-422 for I²C bytes while the SPI components 410 are configured to monitor the pins 414-422 for SPI frames. Once one of the sets of components 406, 410 detects the corresponding protocol, the other components are disabled. In implementations in which the I²C components 406 and the SPI components 410 correspond to the I²C components 258 and the SPI components 210 of FIG. 2, the first pin 414 may be coupled to the SCL line 262 and to the CSN line 212. Similarly, the fifth pin 422 may be coupled to the SDA line 266 (which may include the I²C data in line 268 and the I²C ACK line 284) and the SCLK line 226.

Figure 5:
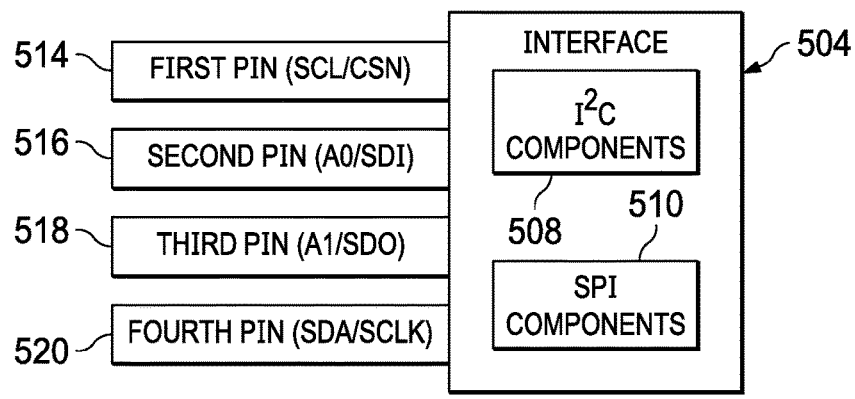
FIG. 5 is a block diagram of a 4 pin interface that supports both SPI and $I^2C$.

Referring to FIG. 5, a diagram of an interface with a 4 pin configuration that supports both SPI and I²C is shown. In the illustrated example, an interface 504 includes a first pin 514, a second pin 516, a third pin 518, a fourth pin 520, I²C components 508, and SPI components 510. The interface 504 may be included in the device 101 of FIG. 1 in lieu of the interface 102 or may be included in a different device. The I²C components 508 may correspond to the I²C components 258 and the SPI components 510 may correspond to the SPI components 210. In the illustrated example, the first pin 514 is mapped to the SCL signal for I²C and to the CSN (i.e., $\overline{CS}$) signal for SPI. The second pin 516 is mapped to the A0 signal for I²C and to the SDI signal for SPI. The third pin 518 is mapped to the A1 signal for I²C and to the SDO signal for SPI. The fourth pin 520 is mapped to the SDA signal for I²C and to the SCLK signal for SPI.

The I²C components 508 are configured to monitor the pins 514-520 for I²C bytes while the SPI components 510 are configured to monitor the pins 514-520 for SPI frames. Once one of the sets of components 508, 510 detects the corresponding protocol, the other components are disabled. In implementations in which the I²C components 508 and the SPI components 510 correspond to the I²C components 258 and the SPI components 210 of FIG. 2, the first pin 514 may be coupled to the SCL line 262 and to the CSN line 212. Similarly, the fourth pin 520 may be coupled to the SDA line 266 (which may include the I²C data in line 268 and the I²C ACK line 284) and the SCLK line 226.

Figure 6:
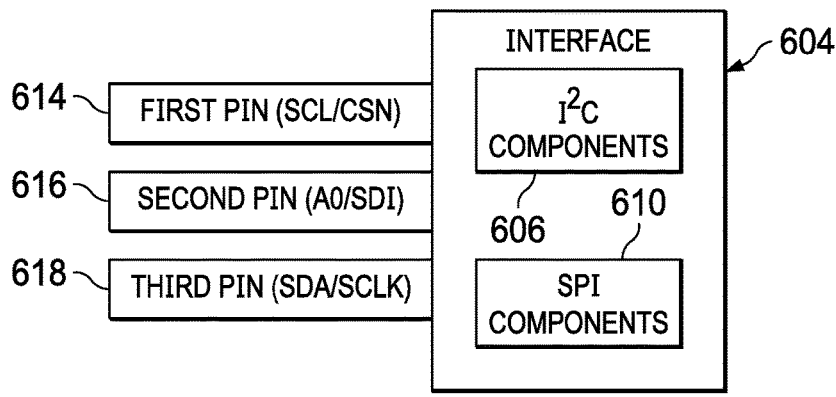
FIG. 6 is a block diagram of a 3 pin interface that supports both SPI and $I^2C$.

Referring to FIG. 6, a diagram of an interface with a 3 pin configuration that supports both SPI and I²C is shown. In the illustrated example, an interface 604 includes a first pin 614, a second pin 616, a third pin 618, I²C components 606, and SPI components 610. The interface 604 may be included in the device 101 of FIG. 1 in lieu of the interface 102 or may be included in a different device. The I²C components 606 may correspond to the I²C components 258 and the SPI components 610 may correspond to the SPI components 210. In the illustrated example, the first pin 614 is mapped to the SCL signal for I²C and to the CSN (i.e., $\overline{CS}$) signal for SPI. The second pin 616 is mapped to the A0 signal for I²C and to the SDI signal for SPI. The third pin 618 is mapped to the SDA signal for I²C and to the SCLK signal for SPI.

The I²C components 606 are configured to monitor the pins 614-618 for I²C bytes while the SPI components 610 are configured to monitor the pins 614-618 for SPI frames. Once one of the sets of components 606, 610 detects the corresponding protocol, the other components are disabled. In implementations in which the I²C components 608 and the SPI components 610 correspond to the I²C components 258 and the SPI components 210 of FIG. 2, the first pin 614 may be coupled to the SCL line 262 and to the CSN line 212. Similarly, the third pin 618 may be coupled to the SDA line 266 (which may include the I²C data in line 268 and the I²C ACK line 284) and the SCLK line 226.

Thus, FIGS. 4-6 illustrate different pin configurations supported by the present disclosure. Each of the configurations illustrated in FIGS. 4-6 is compatible with the techniques for automatically detecting and operating according to a protocol described herein.

FIG. 7 illustrates a timing diagram showing an I²C byte 702 received at one of the interfaces illustrated in FIGS. 4-6. As illustrated in FIG. 7, a first signal 704 is received at an interface pin that I²C components of the interface interpret as an SDA pin and SPI components of the interface interpret as an SCLK pin. For example, the first signal 704 may be received by the fifth pin 422, the fourth pin 520, or the third pin 618 as illustrated in FIGS. 4-6 respectively. A second signal 706 is received at an interface pin that the I²C components of the interface interpret as an SLC pin and SPI components of the interface interpret as an CSN pin. For example, the second signal 706 may be received by the fifth pin 422, the fourth pin 520, or the third pin 618 as illustrated in FIGS. 4-6 respectively.

The I²C byte detection method 330 and the SPI frame detection method 310 are simultaneously used (e.g., by the I²C components 258 and the SPI components 210) to monitor the signals 704, 706 to determine whether the signals correspond to an I²C byte of an SPI frame. In the illustrated example, the I²C byte detection method 330 detects a falling edge 708 on the first signal 704 (i.e., SDA) while the second signal 706 (SCL) is high and so transitions from the idle state 332 and attempts to decode a device ID, at 334. Once a device ID 710 is decoded, the I²C byte detection method 330 proceeds to generate an ACK, at 336, and to disable SPI detection while causing the interface to operate in I²C mode, at 338.

The SPI frame detection method 310 transitions from the idle state 312 upon detecting a falling edge 720 in the second signal 706 (i.e., CSN) and resets the SCLK counter, at 314. However, the next rising edge of the second signal 706 occurs before the SCLK counter reaches a number indicative of SPI (e.g., 24) so the SPI frame detection method 310 determines there is no valid SPI frame and returns to the idle state 312. The SPI frame detection method 310 continues transitioning from idle and detecting invalid frames in this manner until the I²C byte detection method 330 disables SPI detection.

Thus, FIG. 7 illustrates an example of signals that result in an interface operating in an I²C mode and disabling SPI detection within the interface.

FIG. 8 illustrates a first timing diagram showing an SPI frame received at one of the interfaces illustrated in FIGS. 4-6. In FIG. 8, a first signal 804 is received at an interface pin that I²C components of the interface interpret as an SDA pin and SPI components of the interface interpret as an SCLK pin. For example, the first signal 804 may be received by the fifth pin 422, the fourth pin 520, or the third pin 618 as illustrated in FIGS. 4-6 respectively. A second signal 806 is received at an interface pin that the I²C components of the interface interpret as an SLC pin and SPI components of the interface interpret as an CSN pin. For example, the second signal 806 may be received by the fifth pin 422, the fourth pin 520, or the third pin 618 as illustrated in FIGS. 4-6 respectively. The signals 804, 806 indicate an SPI frame transmitted using a burst mode SCLK signal.

The SPI frame detection method 310 transitions from the idle state 312 in response to detecting a falling edge 810 in the second signal 806 (i.e., CSN) and continues incrementing the SCLK counter based on the first signal 804, at 316. In response to determining that the SCLK counter indicates a SPI frame (e.g., equals 24) when a next rising edge 812 occurs in the second signal 806. Accordingly, the SPI frame detection method 310 causes the interface to operate in SPI mode and disables I²C detection.

Before being disabled, the I²C byte detection method 330 stays in the idle state 332 because no I²C start condition is detected in the signals 804, 806. Thus, FIG. 8 illustrates an example of signals that result in an interface operating in an SPI mode and disabling I²C detection within the interface.

Figure 9:
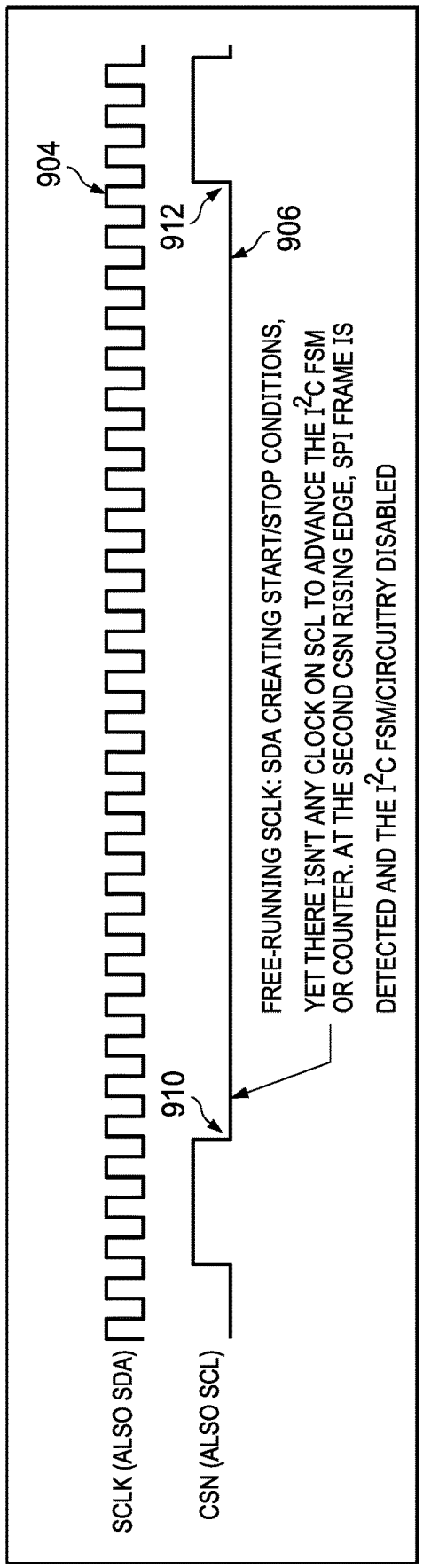
FIG. 9 is a second timing diagram showing an SPI frame received at one of the interfaces illustrated in FIGS. 4-6

FIG. 9 illustrates a second timing diagram showing an SPI frame received at one of the interfaces illustrated in FIGS. 4-6. FIG. 9 differs from FIG. 8 in that the SPI frame of FIG. 9 is transmitted using a free-running SCLK. In FIG. 9, a first signal 904 is received at an interface pin that I²C components of the interface interpret as an SDA pin and SPI components of the interface interpret as an SCLK pin. For example, the first signal 904 may be received by the fifth pin 422, the fourth pin 520, or the third pin 618 as illustrated in FIGS. 4-6 respectively. A second signal 906 is received at an interface pin that the I²C components of the interface interpret as an SLC pin and SPI components of the interface interpret as an CSN pin. For example, the second signal 906 may be received by the fifth pin 422, the fourth pin 520, or the third pin 618 as illustrated in FIGS. 4-6 respectively.

As described with respect to FIG. 8, the SPI frame detection method 310 identifies an SPI frame based on a count SCLK pulses between a falling edge 910 in the second signal 906 and a rising edge 912 in the second signal 906. The I²C byte detection method 330 detects various start conditions (falling edge on the first signal 904 while the second signal 906 is high) and stop conditions (rising edge on the first signal 904 while the second signal 906 is high), but an absence of pulses on the second signal between falling edge 910 and the rising edge 912 prevents the I²C byte detection method 330 from decoding a valid address.

Thus, FIG. 9 illustrates another example of signals that result in an interface operating in an SPI mode and disabling I²C detection within the interface.

Figure 10:
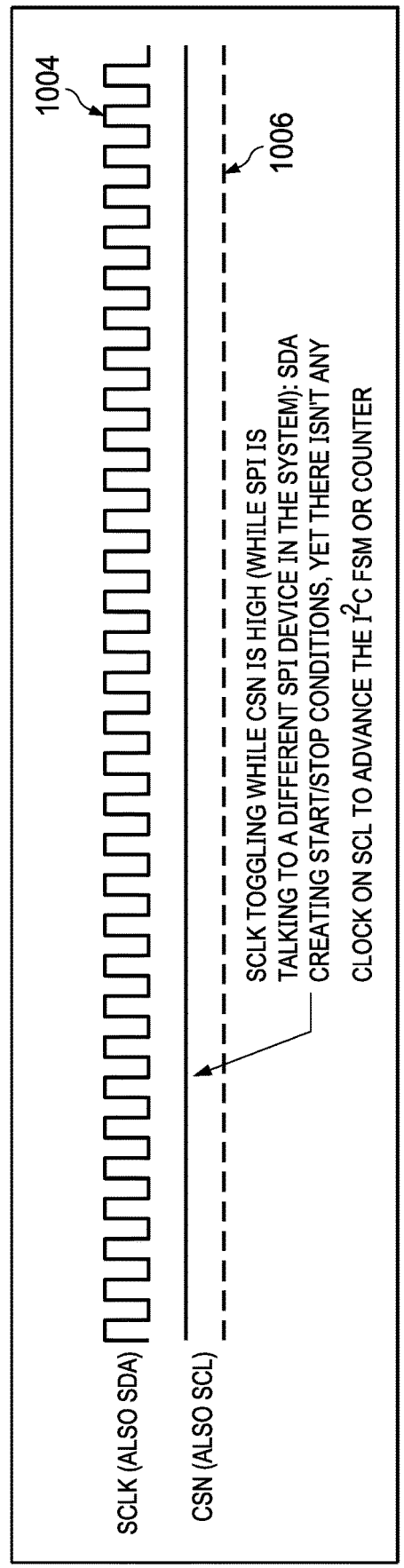
FIG. 10 is a timing diagram showing SPI signals received at one of the interfaces illustrated in FIGS. 4-6 but addressed to a different interface.

FIG. 10 illustrates a timing diagram showing SPI signals received at one of the interfaces illustrated in FIGS. 4-6 but addressed to a different interface. In the illustrated example of FIG. 10, the SPI detection method 310 does not leave the idle state 312 because there is no falling edge on the second signal 1006 (i.e., CSN). The I²C byte detection method 330 does detects start conditions at each falling edge of the first signal 1004 but never decodes a valid device ID because each start condition is immediately followed by a stop condition.

Thus, FIG. 10 illustrates that the interfaces described herein may not falsely identify a protocol while observing signals related to other devices.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
receiving signals at terminals of an interface having first components configured to detect an inter-integrated circuit (I2C) protocol, and second components, separate from the first components, configured to detect a serial peripheral interface (SPI) protocol;
concurrently detecting and interpreting the signals at each of the first components and the second components, wherein the first components are configured to detect and interpret only signals corresponding to the I2C protocol and the second components are configured to detect and interpret only signals corresponding to the SPI protocol;
determining, by the second components, whether the signals received at the interface correspond to the SPI protocol by counting pulses on a serial clock signal and comparing the pulses to a complete frame;
transmitting a first reset signal from the first components to the second components to disable the second components in response to the second components determining that the signals received at the terminals correspond to the I2C protocol; and
transmitting a second reset signal from the second components to the first components to disable the first components in response to the first components determining that the signals received at the terminals correspond to the SPI protocol.

2. The method of claim 1, including interpreting future signals received at the interface using the first components while the second components are disabled.

3. The method of claim 1, wherein the first components transmit the first reset signal to the second components in response to decoding a device identifier in the signals received at the terminals.

4. The method of claim 1, wherein one of the signals received at the terminals of the interface is interpreted as a serial clock line (SCL) signal by the first components, and as an inverted chip select signal (CSN) by the second components.

5. The method of claim 1, wherein the second components transmit the second reset signal to the first components in response to decoding a device identifier in the signals received at the terminals.

6. A semiconductor device comprising:
an interface including:
a plurality of terminals;
first components configured to detect and interpret only signals received at the terminals according to an inter-integrated circuit (I2C) protocol by counting pulses on a first serial clock signal and comparing the pulses to a complete frame; and
second components configured to, concurrently with the first components, detect and interpret only signals received at the terminals according to a serial peripheral interface (SPI) protocol by counting pulses on a second serial clock signal and comparing the pulses to a complete frame, wherein the first components are configured to send a first reset signal to the second components in response to a determination that the signals correspond to the I2C protocol, and wherein the second components are configured to send a second reset signal to the first components in response to a determination that the signals correspond to the SPI protocol; and
an electrically erasable programmable read-only memory (EEPROM) configured to store data received via the interface.

7. The semiconductor device of claim 6, wherein the semiconductor device corresponds to an analog monitoring and control device configured to operate based on the data stored in the EEPROM.

8. The semiconductor device of claim 6, wherein the first components are configured to interpret a first terminal as a first clock input for the I2C protocol, and wherein the second components are configured to interpret a second terminal as a second clock input for the SPI protocol.

9. The semiconductor device of claim 6, including lookup tables configured to store information received via the interface.

10. A device comprising:
an interface including:
terminals configured to receive signals;
first components configured to detect and interpret the only signals according to inter-integrated circuit (I2C) protocol by counting pulses on a first serial clock signal and comparing the pulses to a complete frame; and
second components, separate from the first components, configured to concurrently detect and interpret only signals according to serial peripheral interface (SPI) protocol by counting pulses on a second serial clock signal and comparing the pulses to a complete frame, wherein the first components are configured to send a first reset signal to the second components in response to a determination that the signals correspond to the I2C protocol, and wherein the second components are configured to send a second reset signal to the first components in response to a determination that the signals correspond to the SPI protocol.

11. The device of claim 10, wherein the first components include a first shift register and a first finite state machine, and wherein the second components include a second shift register and a second finite state machine.

12. The device of claim 10, wherein the first components are configured to interpret a first terminal of the terminals as a first clock input for the I2C protocol, and wherein the second components are configured to interpret a second terminal as a second clock input for the SPI protocol.

13. The device of claim 12, wherein the first components are configured to interpret the second terminal as a data input for the I2C protocol.

14. The device of claim 10, wherein the first components are configured to interpret:
a first terminal as an I2C serial clock line (SCL) input;
a second terminal as an I2C serial data (SDA) input;
a third terminal as an I2C 0th bit address (A0) input;
a fourth terminal as an I2C first bit address (A1) input; and
a fifth terminal as an I2C second bit address (A2) input, and wherein the second components are configured to interpret:
the first terminal as an SPI inverted chip select (CSN) input;
the second terminal as an SPI ground input;
the third terminal as an SPI serial data out (SDO) terminal;
the fourth terminal as an SPI serial data in (SDI) input; and
the fifth terminal as an SPI serial clock (SCLK) input.

15. The device of claim 10, wherein the first components are configured to interpret:
a first terminal as an I2C serial clock line (SCL) input;
a second terminal as an I2C 0th bit address (A0) input;
a third terminal as an I2C first bit address (A1) input;
a fourth terminal as an I2C second bit address (A2) input; and
a fifth terminal as an I2C serial data (SDA) input, and wherein the second components are configured to interpret:
the first terminal as an SPI inverted chip select (CSN) input;
the second terminal as an SPI serial data in (SDI) input;
the third terminal as an SPI serial data out (SDO) input;
the fourth terminal as an SPI interrupt request (IRQ) input; and
the fifth terminal as an SPI serial clock (SCLK) input.

16. The device of claim 10, wherein the first components are configured to interpret:
a first terminal as an I2C serial clock line (SCL) input;
a second terminal as an I2C 0th bit address (A0) input;
a third terminal as an I2C first bit address (A1) input; and
a fourth terminal as an I2C serial data (SDA) input, and wherein the second components are configured to interpret:
the first terminal as an SPI inverted chip select (CSN) input;
the second terminal as an SPI serial data in (SDI) input;
the third terminal as an SPI serial data out (SDO) input; and
the fourth terminal as an SPI serial clock (SCLK) input.

17. The device of claim 10, wherein the first components are configured to interpret:
a first terminal as an I2C serial clock line (SCL) input;
a second terminal as an I2C 0th bit address (A0) input; and
a third terminal as an I2C serial data (SDA) input, and wherein the second components are configured to interpret:
the first terminal as an SPI inverted chip select (CSN) input;
the second terminal as an SPI serial data in (SDI) input; and
the third terminal as an SPI serial clock (SCLK) input.

18. The device of claim 10, including an electrically erasable programmable read only memory (EEPROM) coupled to the interface via a bus.

19. The device of claim 18, including a look-up table coupled to the interface via the bus.

* * * * *